(12) United States Patent
Barz

(10) Patent No.: US 6,474,722 B2
(45) Date of Patent: *Nov. 5, 2002

(54) STRUCTURAL REINFORCEMENT MEMBER FOR WHEEL WELL

(75) Inventor: William J. Barz, Shelby Township, MI (US)

(73) Assignee: L&L Products, Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/906,289

(22) Filed: Jul. 16, 2001

(65) Prior Publication Data
US 2001/0040388 A1 Nov. 15, 2001

Related U.S. Application Data

(63) Continuation of application No. 09/524,960, filed on Mar. 14, 2000.

(51) Int. Cl.[7] .............................. B60J 7/00; B60K 37/00; B60N 2/00; B60N 3/00; B60R 77/00
(52) U.S. Cl. .................................. 296/187; 296/198
(58) Field of Search .................................. 296/187, 193, 296/198, 203.01

(56) References Cited

U.S. PATENT DOCUMENTS

| | | |
|---|---|---|
| 1,814,677 A | 1/1931 | Fennema |
| 3,054,636 A | 9/1962 | Wessells, III |
| 3,649,375 A | 3/1972 | Venkatesan |
| 3,746,387 A | 7/1973 | Schwenk |
| 3,757,559 A | 9/1973 | Welsh |
| 3,890,108 A | 6/1975 | Welsh |
| 4,029,128 A | 6/1977 | Yamagishi |
| 4,083,384 A | 4/1978 | Horne et al. |
| 4,090,734 A | 5/1978 | Inami et al. |
| 4,378,395 A | 3/1983 | Aoshina et al. |

(List continued on next page.)

FOREIGN PATENT DOCUMENTS

| | | |
|---|---|---|
| DE | 2919046 | 5/1979 |
| DE | 3627725 A1 | 8/1986 |
| DE | 4028895 C1 | 9/1990 |
| DE | G9011147.8 | 9/1990 |
| DE | G9320333.0 | 6/1994 |
| DE | 19635734 A1 | 9/1996 |
| DE | 19648164 A1 | 11/1996 |
| DE | 19753658 A1 | 12/1997 |
| DE | 19812288 C1 | 2/1998 |
| DE | 19858903 A1 | 12/1998 |

(List continued on next page.)

OTHER PUBLICATIONS

International Search Report dated Sep. 13, 2001.
Copending application, Ser. No. 09/524,298, filed Mar. 14, 2000.
Copending application,Ser. No. 09/584,211, filed May 31, 2000.

(List continued on next page.)

Primary Examiner—Stephen T. Gordon
Assistant Examiner—Scott Carpenter
(74) Attorney, Agent, or Firm—Debrusin & Thennisch PC

(57) ABSTRACT

A structural reinforcement member for reinforcing a wheel well area of an automobile includes a carrier and a load distributing medium supported by the carrier. The carrier also may include a reinforced protrusion, two reinforced openings, and an outwardly extending flange. The flange includes a reinforced raised portion having a shape similar to that of the flange. The load distributing medium is a structural foam and preferably an epoxy-based resin. The preferred load distributing medium is L5206, L5207, L5208, or L5209 structural foam commercially available from L&L Products of Romeo, Mich.

17 Claims, 3 Drawing Sheets

U.S. PATENT DOCUMENTS

| | | | |
|---|---|---|---|
| 4,440,434 A | 4/1984 | Celli | |
| 4,457,555 A | 7/1984 | Draper | |
| 4,463,870 A | 8/1984 | Coburn, Jr. et al. | |
| 4,559,274 A | 12/1985 | Kloppe et al. | |
| 4,610,836 A | 9/1986 | Wycech | |
| 4,613,177 A | 9/1986 | Loren et al. | |
| 4,695,343 A | 9/1987 | Wycech | |
| 4,705,716 A | 11/1987 | Tang | |
| 4,732,806 A | 3/1988 | Wycech | |
| 4,751,249 A | 6/1988 | Wycech | |
| 4,769,391 A | 9/1988 | Wycech | |
| 4,813,690 A | 3/1989 | Coburn | |
| 4,836,516 A | 6/1989 | Wycech | |
| 4,853,270 A | 8/1989 | Wycech | |
| 4,861,097 A | 8/1989 | Wycech | |
| 4,901,395 A | 2/1990 | Semrau | |
| 4,901,500 A | 2/1990 | Wycech | |
| 4,908,930 A | 3/1990 | Wycech | |
| 4,917,435 A | 4/1990 | Bonnett et al. | |
| 4,922,596 A | 5/1990 | Wycech | |
| 4,923,902 A | 5/1990 | Wycech | |
| 4,946,737 A | 8/1990 | Lindeman et al. | |
| 4,978,562 A | 12/1990 | Wycech | |
| 4,984,406 A | 1/1991 | Friesen | |
| 4,989,913 A | 2/1991 | Moore, III | |
| 4,995,545 A | 2/1991 | Wycech | |
| 5,040,803 A | 8/1991 | Cieslik et al. | |
| 5,072,952 A | 12/1991 | Irrgeher et al. | |
| 5,102,188 A | 4/1992 | Yamane | |
| 5,122,398 A | 6/1992 | Seiler et al. | |
| 5,124,186 A | 6/1992 | Wycech | |
| 5,213,391 A | 5/1993 | Takagi | |
| 5,266,133 A | 11/1993 | Hanley et al. | |
| 5,358,397 A | 10/1994 | Ligon et al. | |
| 5,373,027 A | 12/1994 | Hanley et al. | |
| 5,382,397 A | 1/1995 | Turner, Jr. | |
| 5,506,025 A * | 4/1996 | Otto et al. | |
| 5,560,672 A | 10/1996 | Lim et al. | |
| 5,575,526 A | 11/1996 | Wycech | |
| 5,577,784 A | 11/1996 | Nelson | |
| 5,642,914 A * | 7/1997 | Takabatake | |
| 5,648,401 A | 7/1997 | Czaplicki et al. | |
| 5,649,400 A | 7/1997 | Miwa | |
| 5,652,039 A | 7/1997 | Tremain et al. | |
| 5,755,486 A | 5/1998 | Wycech | |
| 5,766,719 A | 6/1998 | Rimkus | |
| 5,803,533 A | 9/1998 | Schulz et al. | |
| 5,804,608 A | 9/1998 | Nakazato et al. | |
| 5,806,915 A * | 9/1998 | Takabatake | |
| 5,806,919 A | 9/1998 | Davies | |
| 5,819,408 A | 10/1998 | Catlin | |
| 5,851,626 A | 12/1998 | McCorry et al. | |
| 5,866,052 A | 2/1999 | Muramatsu | |
| 5,871,849 A | 2/1999 | Lepine | |
| 5,878,784 A | 3/1999 | Sales et al. | |
| 5,884,960 A | 3/1999 | Wycech | |
| 5,888,600 A | 3/1999 | Wycech | |
| 5,888,642 A | 3/1999 | Meteer et al. | |
| 5,894,071 A | 4/1999 | Merz et al. | |
| 5,901,528 A | 5/1999 | Richardson | |
| 5,901,752 A | 5/1999 | Lundman | |
| 5,902,656 A | 5/1999 | Hwang | |
| 5,904,024 A | 5/1999 | Miwa | |
| 5,932,680 A | 8/1999 | Heider | |
| 5,941,597 A | 8/1999 | Horiuchi et al. | |
| 5,985,435 A | 11/1999 | Czaplicki et al. | |
| 5,988,734 A * | 11/1999 | Longo et al. | |
| 5,992,923 A | 11/1999 | Wycech | |
| 5,994,422 A | 11/1999 | Born et al. | |
| 6,003,274 A | 12/1999 | Wycech | |
| 6,004,425 A | 12/1999 | Born et al. | |
| 6,006,484 A | 12/1999 | Geissbuhler | |
| 6,022,066 A | 2/2000 | Tremblay et al. | |
| 6,033,300 A | 3/2000 | Schneider | |
| 6,050,630 A * | 4/2000 | Hochet | |
| 6,053,210 A | 4/2000 | Chapman et al. | |
| 6,058,673 A | 5/2000 | Wycech | |
| 6,059,342 A | 5/2000 | Kawai et al. | |
| 6,068,424 A | 5/2000 | Wycech | |
| 6,073,991 A | 6/2000 | Naert | |
| 6,077,884 A | 6/2000 | Hess et al. | |
| 6,079,180 A | 6/2000 | Wycech | |
| 6,082,811 A | 7/2000 | Yoshida | |
| 6,090,232 A | 7/2000 | Seeliger et al. | |
| 6,092,862 A | 7/2000 | Wycech et al. | |
| 6,092,864 A * | 7/2000 | Wycech et al. | |
| 6,094,798 A | 8/2000 | Seeliger et al. | |
| 6,096,403 A | 8/2000 | Wycech et al. | |
| 6,096,791 A | 8/2000 | Born et al. | |
| 6,099,948 A | 8/2000 | Paver, Jr. | |
| 6,102,379 A | 8/2000 | Ponslet et al. | |
| 6,102,473 A | 8/2000 | Steininger et al. | |
| 6,103,341 A | 8/2000 | Barz et al. | |
| 6,103,784 A | 8/2000 | Hilborn et al. | |
| 6,110,982 A | 8/2000 | Russick et al. | |
| 6,129,410 A | 10/2000 | Kosaraju et al. | |
| 6,131,897 A | 10/2000 | Barz et al. | |
| 6,135,542 A | 10/2000 | Emmelmann et al. | |
| 6,146,565 A | 11/2000 | Keller | |
| 6,149,227 A | 11/2000 | Wycech | |
| 6,152,260 A | 11/2000 | Eipper et al. | |
| 6,153,709 A | 11/2000 | Xiao et al. | |
| 6,540,428 | 11/2000 | Hanley, IV et al. | |
| 6,165,588 A | 12/2000 | Wycech | |
| 6,168,226 B1 | 1/2001 | Wycech | |
| 6,174,932 B1 | 1/2001 | Pachl et al. | |
| 6,189,953 B1 | 2/2001 | Wycech | |
| 6,196,621 B1 | 3/2001 | VanAssche et al. | |
| 6,197,403 B1 | 3/2001 | Brown et al. | |
| 6,199,040 B1 | 3/2001 | Hopton et al. | |
| 6,232,433 B1 | 5/2001 | Narayan | |
| 6,233,826 B1 | 5/2001 | Wycech | |
| 6,237,304 B1 | 5/2001 | Wycech | |
| 6,247,287 B1 | 6/2001 | Takabatake | |
| 6,253,524 B1 | 7/2001 | Hopton et al. | |
| 6,263,635 B1 | 7/2001 | Czaplicki | |
| 6,270,600 B1 | 8/2001 | Wycech | |
| 6,272,809 B1 | 8/2001 | Wycech | |
| 6,276,105 B1 | 8/2001 | Wycech | |
| 6,277,898 B1 | 8/2001 | Pachl et al. | |
| 6,281,260 B1 | 8/2001 | Hanley, IV et al. | |
| 6,287,666 B1 | 9/2001 | Wycech | |
| 6,286,298 B1 | 10/2001 | Barz | |
| 6,296,298 B1 * | 10/2001 | Barz et al. | |
| 6,303,672 B1 | 10/2001 | Papalos et al. | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,348,513 B1 | 2/2002 | Hilborn et al. | |

FOREIGN PATENT DOCUMENTS

| | | |
|---|---|---|
| DE | 29904705 U1 | 3/1999 |
| DE | 198 12 288 C1 | 5/1999 |
| DE | 198 56 255 C1 | 1/2000 |
| EP | 82102135.9 | 3/1982 |
| EP | 90202150.0 | 8/1990 |
| EP | 91104546.6 | 3/1991 |

| | | |
|---|---|---|
| EP | 94101343.5 | 1/1994 |
| EP | 0679501 A1 | 3/1994 |
| EP | 0775721 A1 | 5/1997 |
| EP | 0 891 918 A1 | 1/1999 |
| EP | 0 893 331 A1 | 1/1999 |
| EP | 0 893 332 A1 | 1/1999 |
| EP | 0697956 B1 | 6/1999 |
| EP | 0 893 332 B1 | 3/2002 |
| FR | 2539693 A1 | 1/1983 |
| FR | 2749263 A1 | 5/1996 |
| FR | 2 749 263 | 12/1997 |
| GB | 628863 | 3/1947 |
| GB | 8028960 | 9/1980 |
| GB | 2156415 A | 3/1984 |
| GB | 8725028 | 10/1987 |
| JP | 61118211 | 6/1986 |
| JP | 01069309 | 3/1989 |
| JP | 64-59309 | 3/1989 |
| JP | 64-69308 | 3/1989 |
| JP | 01164867 | 6/1989 |
| JP | 2-206537 | 8/1990 |
| WO | WO/8701978 | 4/1987 |
| WO | PCT/JP88/00029 | 1/1988 |
| WO | WO/8906595 | 7/1989 |
| WO | PCT/AU92/00468 | 9/1992 |
| WO | PCT/EP95/00896 | 3/1995 |
| WO | WO95/632110 | 11/1995 |
| WO | PCT/US96/11155 | 7/1996 |
| WO | WO 97/43501 | 11/1997 |
| WO | PCT/US98/16461 | 8/1998 |
| WO | PCT/US98/17994 | 9/1998 |
| WO | WO 98/50221 | 11/1998 |
| WO | PCT/US99/00035 | 1/1999 |
| WO | PCT/US99/00770 | 1/1999 |
| WO | PCT/US99/01855 | 2/1999 |
| WO | PCT/US99/01865 | 2/1999 |
| WO | PCT/US99/04263 | 3/1999 |
| WO | PCT/US99/04279 | 3/1999 |
| WO | PCT/CA99/00424 | 5/1999 |
| WO | PCT/US99/10441 | 5/1999 |
| WO | PCT/US99/11109 | 5/1999 |
| WO | PCT/US99/11110 | 5/1999 |
| WO | PCT/US99/11194 | 5/1999 |
| WO | PCT/US99/11195 | 5/1999 |
| WO | PCT/EP99/03832 | 6/1999 |
| WO | WO99/28575 | 6/1999 |
| WO | PCT/EP99/06112 | 8/1999 |
| WO | PCT/US99/18820 | 8/1999 |
| WO | PCT/EP99/07143 | 9/1999 |
| WO | PCT/US99/18832 | 9/1999 |
| WO | WO 99/48746 | 9/1999 |
| WO | PCT/US99/24795 | 10/1999 |
| WO | WO 99/50057 | 10/1999 |
| WO | PCT/DE99/04103 | 12/1999 |
| WO | PCT/EP99/09541 | 12/1999 |
| WO | PCT/EP99/09732 | 12/1999 |
| WO | PCT/EP99/09909 | 12/1999 |
| WO | PCT/EP99/10151 | 12/1999 |
| WO | PCT/US99/29986 | 12/1999 |
| WO | PCT/US99/29987 | 12/1999 |
| WO | PCT/US99/29990 | 12/1999 |
| WO | PCT/US99/29991 | 12/1999 |
| WO | PCT/US99/29992 | 12/1999 |
| WO | PCT/US00/00010 | 1/2000 |
| WO | PCT/EP00/00021 | 1/2000 |
| WO | PCT/US00/00497 | 1/2000 |
| WO | PCT/US00/01644 | 1/2000 |
| WO | WO00/03894 | 1/2000 |
| WO | PCT/EP00/01474 | 2/2000 |
| WO | PCT/US00/02631 | 2/2000 |
| WO | PCT/AT00/00123 | 5/2000 |
| WO | WO00/37302 | 6/2000 |
| WO | WO 00/43254 | 7/2000 |
| WO | WO00/52086 | 9/2000 |
| WO | WO 00/55444 | 9/2000 |
| WO | WO01/54936 A1 | 8/2001 |
| WO | WO01/56845 A1 | 8/2001 |
| WO | WO01/57130 A1 | 8/2001 |
| WO | WO01/71225 A1 | 9/2001 |
| WO | WO01/83206 A1 | 11/2001 |

OTHER PUBLICATIONS

Copending application, Ser. No. 09/655,965, filed Sep. 6, 2000.
Copending application, Ser. No. 09/858,939, filed May 16, 2001.
Copending application, Ser. No. 09/859,126, filed May 16, 2001.
Copending application, Ser. No. 09/923,138, filed Aug. 6, 2001.
Copending application, Ser. No. 09/939,152, filed Aug. 24, 2001.
Copending application, Ser. No. 09/939,245, filed Aug. 24, 2001.
Copending application, Ser. No. 09/974,017, filed Oct. 10, 2001.
Copending application, Ser. No. 09/982,681, filed Oct. 18, 2001.
Copending application, Ser. No. 60/296,312, filed Jun. 6, 2001.
Copending application Ser. No. 60,317,009, filed Sep. 4, 2001.
Co–pending application Ser. No. 09/524,961, filed Mar. 14, 2000.
Co–pending application Ser. No. 09/428,243; filed Oct. 27, 1999.
Co–pending application Ser. No. 09/460,322; filed Dec. 10, 1999.
Co–pending application Ser. No. 09/459,756; filed Dec. 10, 1999.
Co–pending application Ser. No. 09/524,298; filed Mar. 14, 2000.
Co–pending application Ser. No. 09/502,686; filed Feb. 11, 2000.
Co–pending application Ser. No. 09/591,877; filed Jun. 12, 2000.
Co–pending application Ser. No. 09/631,211; filed Aug. 3, 2000.
Co–pending application Ser. No. 09/676,443; filed Sep. 29, 2000.
Co–pending application Ser. No. 09/676,335; filed Sep. 29, 2000.
Co–pending application Ser. No. 09/676,725; filed Sep. 29, 2000.

* cited by examiner

STRUCTURAL REINFORCEMENT MEMBER FOR WHEEL WELL

This application is a continuation of copending application: Application Ser. No. 09/524,960 filed on Mar. 14, 2000.

FIELD OF THE INVENTION

The present invention relates generally to a structural reinforcement member for use in increasing the stiffness and strength of a frame assembly, such as an automobile frame. More particularly, the invention relates to a reinforcement member that reinforces the frame using a heat-activated structural foam, and carrier wherein the composite of the carrier and activated foam increases the structural stiffness and strength of the frame.

BACKGROUND OF THE INVENTION

For many years the automobile industry has been concerned with designing frame reinforcement members that do not add significantly to the weight of the automobile. U.S. Pat. Nos. 5,755,486; 4,901,500; and 4,751,249 describe prior art reinforcing devices. While these prior art devices may be advantageous in some circumstances, there is needed a simple low cost structure that permits coupling the reinforcement member to a variety of structures of varying geometric configurations.

SUMMARY OF THE INVENTION

The present invention is directed to a structural reinforcement member designed for reinforcing a wheel well portion of an automobile frame. The reinforcement member includes a polymeric carrier, which may be amenable to injection molding or other such moldable material such as polymeric, metallic, or ceramic, and a load distributing medium disposed on the carrier. In one embodiment, the carrier supports a reinforced protrusion and two reinforced openings. Additionally, the carrier supports an outwardly extending flange. The flange includes a reinforced raised portion having a shape similar to that of the flange. The load distributing medium disposed on the carrier is a structural foam, and is preferably an epoxy-based resin. The preferred load distributing medium is L5206, L5207, L5208, or L5209 structural foam, which is commercially available from L&L Products of Romeo, Mich.

During an automobile assembly process the reinforcement member is positioned against the automobile frame so that the uncured structural foam is against the wheel well portion. Once the foam is cured, the reinforcement member adheres to the frame and distributes any loads that impact the wheel well portion of the automobile frame.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Figure 1:
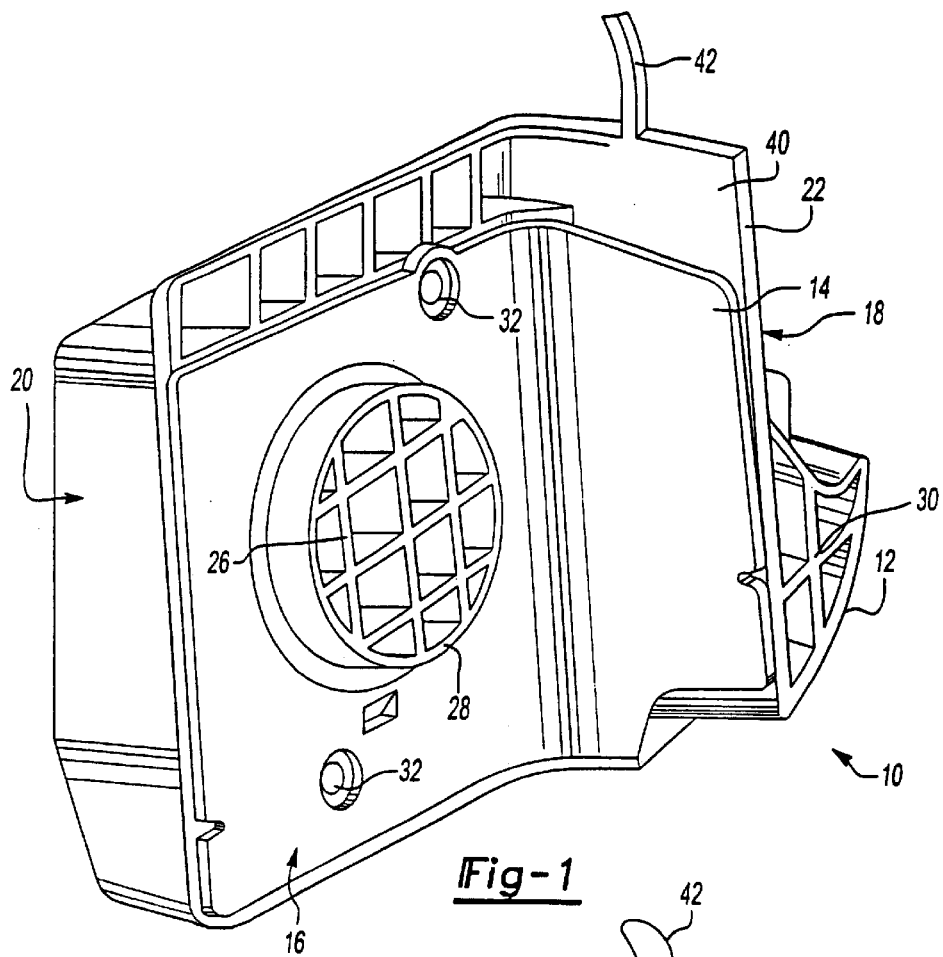
FIG. 1 is a front perspective view of a structural reinforcement member.
Figure 2:
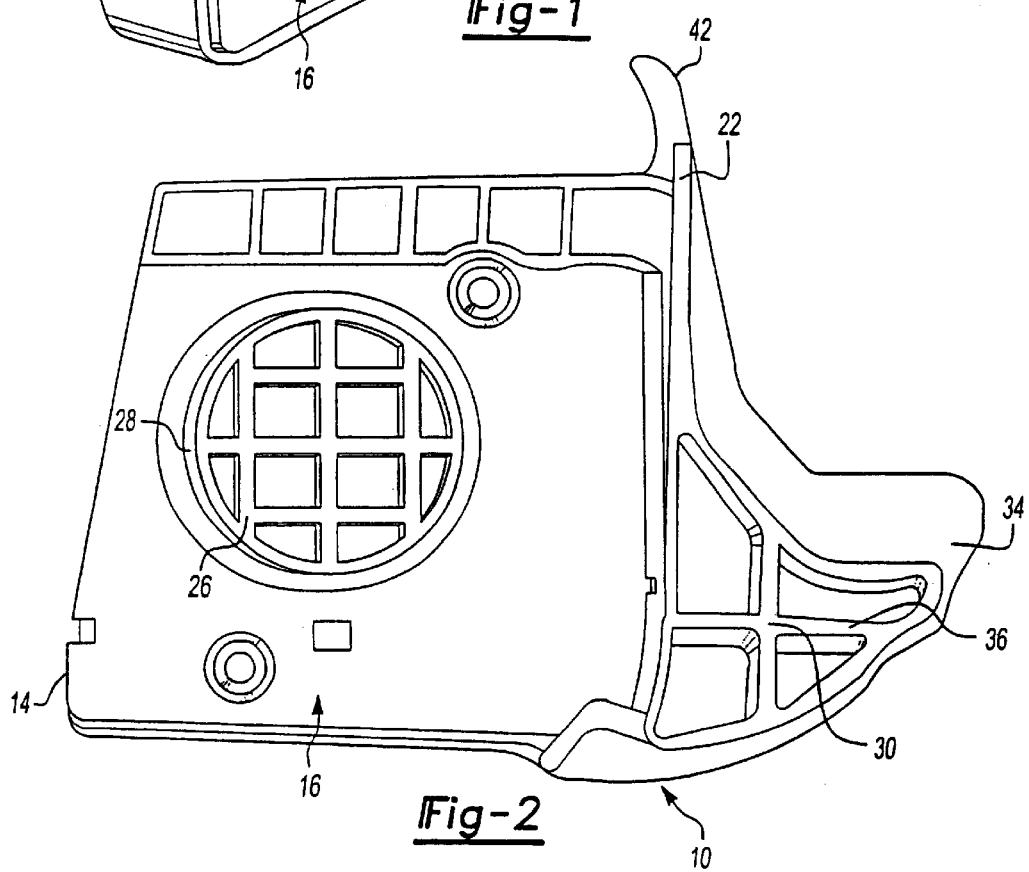
FIG. 2 is a front elevational view of the structural reinforcement member shown in FIG. 1.
Figure 3:
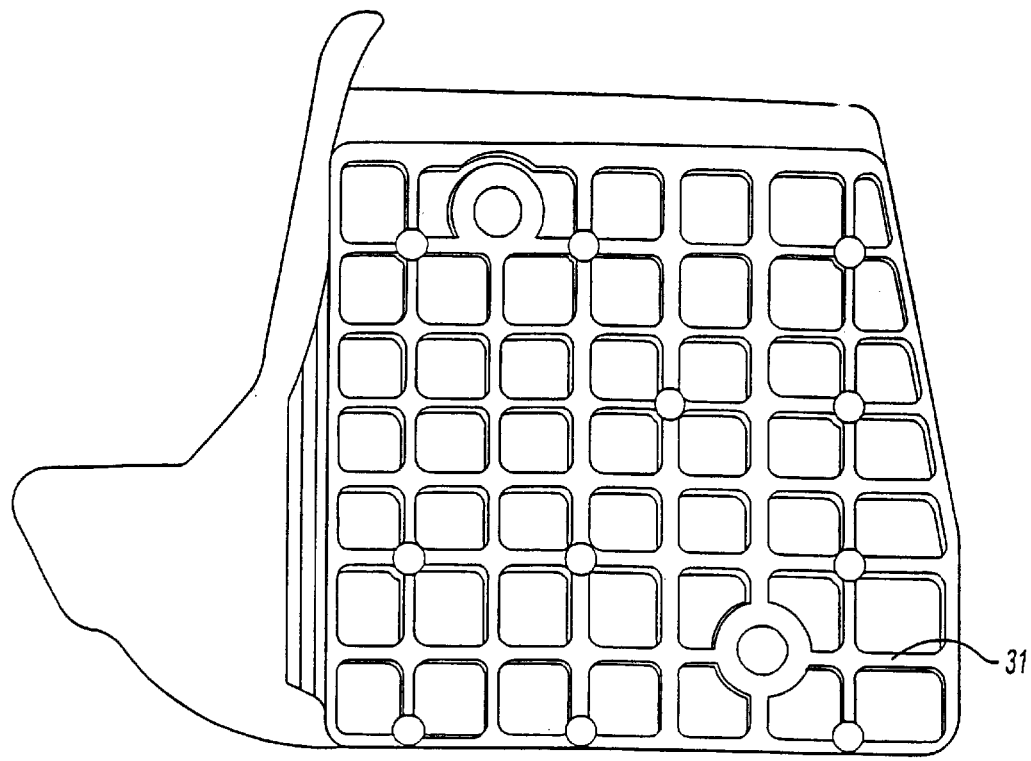
FIG. 3 is a rear elevational of the structural reinforcement member shown in FIG. 1.
Figure 4:
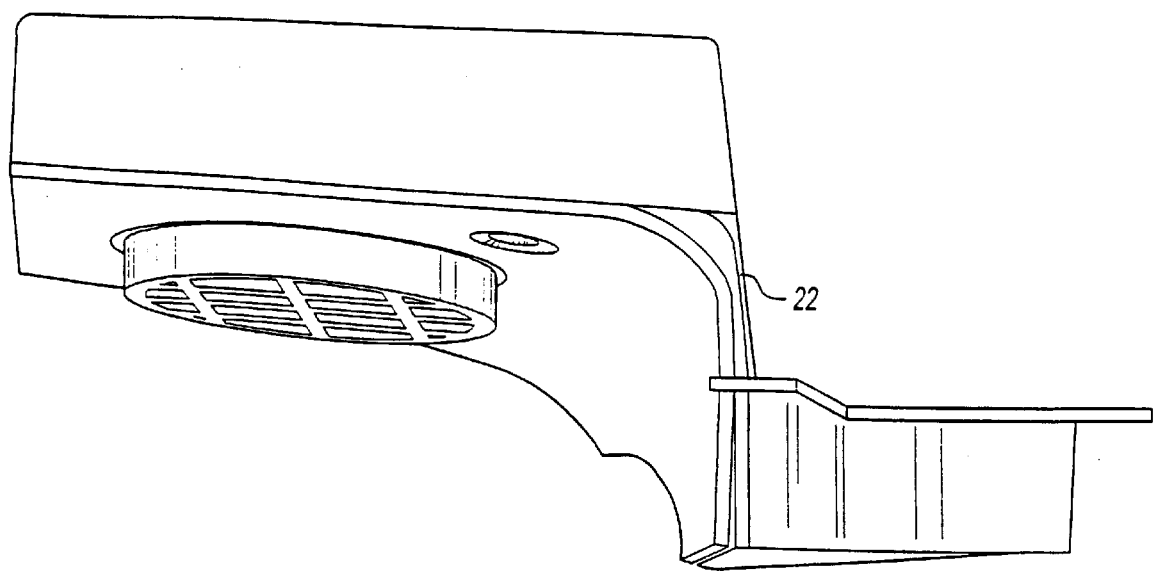
FIG. 4 shows a top plan view of the structural reinforcement member shown in FIG. 1.

FIG. 1 shows a structural reinforcement member 10 formed in accordance with the teachings of this invention. The reinforcement member 10 includes a carrier 12 and a load distributing medium 14 supported by the carrier 12.

The carrier 12 can be formed of a polymeric material, a preferred polymeric material being nylon, but may also consist of a metallic or ceramic material. More preferably the nylon material is a thirty-three percent glass filled nylon. However, it will be appreciated that other materials having similar properties may be used.

One advantage of the carrier 12 being fabricated of a moldable material is the ability to mold the carrier 12 into a variety of configurations. Specifically, the carrier 12 can be fabricated using a mold having virtually the same configuration as the frame portion to which the reinforcement member 10 will be coupled. This facilitates assembling the reinforcement member 10 with the automobile frame without the need for mechanical fasteners or welding.

The carrier 12 is a four-sided structure having a square configuration, and includes a front surface 16, an opposing rear surface 18, and opposing side surfaces 20. It will be appreciated that other suitable geometric configurations may be used to form the carrier 12. For example, the carrier 12 may be rectangular, circular, or a variety of complex geometrical configurations. The particular configuration chosen for the carrier 12 will vary depending on the configuration of the area being reinforced.

In the disclosed embodiment, the front surface 16 is surrounded by opposing sides 20 and rear surface 18, wherein the rear surface 18 is reinforced by a lattice network 31. The front surface 16 supports a raised circular protrusion 28 that is also reinforced by a lattice network 26. It is contemplated that the lattice network 26 may consist of a matrix type design which provides nearly the same level of reinforcement as a solid structure. Adjacent the protrusion 28, the lower portion 23 of the front surface 16 supports and is reinforced by a lattice structure 30. The front surface 16 also includes a pair of reinforced openings 32, and an integrally formed flange 22. The flange 22 projects outwardly from an end portion of the front surface 16 along a radius 17 formed at a location adjacent one of the opposing sides 20.

The flange 22 supports an outward projection 34. The flange 22 also includes an upper portion 40, which tapers to a narrower strip 42 that projects outwardly from and extends along the outer perimeter of the flange 22. The outward projection 34 supports a lattice portion 36 having a configuration virtually similar to that of the outward projection 34.

The structural strength and stiffness of the carrier 12 is increased by applying the load distributing medium 14 to selected surfaces of the carrier member 12. In the preferred embodiment, the load distributing medium 14 is a structural foam applied to the front surface 16. The structural foam 14 increases the strength and structural stiffness of the carrier 12 without adding significantly to the overall weight of the carrier 12. Typically, the structural foam 14 is applied to the carrier 12 in the areas corresponding to frame areas where reinforcement is desired such as a continuous load transfer medium or bonding surface application. In the embodiment shown, the structural foam 14 is applied to the top surface 20 and the sidewall 18.

The structural foam 16 is preferably heat-activated and expands upon heating, typically by a foaming reaction. The structural foam 14 is generally applied to the carrier 12 in a solid or semi-solid state. The structural foam 14 may be applied to the outer perimeter of the carrier 12 in a fluid state using commonly known injection techniques, wherein the structural foam 14 is heated to a temperature that permits the structural foam 14 to flow slightly. Upon cooling the structural foam 14 hardens and adheres to the outer surface of the carrier 12, either via a separate adhesive layer (not shown) or via adhesive characteristics in the structural foam 14 formulation itself. Alternatively, the structural foam 14 may be applied to the carrier 12 as precast pellets, which are heated slightly to permit the pellets to bond to the outer surface of the carrier 12. At this stage, the structural foam 14 is heated just enough to cause the structural foam 14 to flow slightly, but not enough to cause the structural foam 14 to expand. Note that other expandable materials can be used, such as, without limitation, an encapsulated mixture of materials that, when activated by temperature, pressure, chemically, or other by other ambient conditions, will expand.

The structural foam 14 is preferably an epoxy-based material, but may include other polymers such as ethylene copolymers or terpolymers. A copolymer or terpolymer, is composed of two or three different monomers, i.e., small molecules with high chemical reactivity that are capable of linking up with similar molecules.

A number of epoxy-based structural reinforcing foams are known in the art and may also be used to produce the structural foam 14. A typical structural foam includes a polymeric base material, such as an epoxy resin or ethylene-based polymer which, when compounded with appropriate ingredients (typically a blowing agent and curing agent), expands and cures in a reliable and predicable manner upon the application of heat or the occurrence of a particular ambient condition. The resulting material has a density that is sufficient to impart desired rigidity to a supported article. From a chemical standpoint for a thermally-activated material, the structural foam 14 is usually initially processed as a thermoplastic material before curing. After curing, the structural foam 14 typically becomes a thermoset material.

An example of a preferred structural foam 14 formulation is an epoxy-based material including an ethylene copolymer or terpolymer and an alpha-olefin that is commercially available from L&L Products of Romeo, Mich., under the designations L5206, L5207, L5208 and L5209. One advantage of the preferred structural foam materials 14 over prior art materials is that the preferred materials can be processed in several ways. The preferred materials can be processed by injection molding, extrusion or with a mini-applicator type extruder. This enables the formulation and creation of part designs that exceed the capability of most prior art materials.

While the preferred materials for fabricating the structural foam 14 have been disclosed, the structural foam 14 can be formed of other materials provided that the material selected is heat-activated or otherwise activated by an ambient condition (e.g. moisture, pressure, time or the like) and expands in a predictable and reliable manner under appropriate conditions for the selected application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, the disclosures of which are incorporated herein by reference. In general, the desired characteristics of the structural foam 14 include high stiffness, high strength, high glass transition temperature (typically greater than 70 degrees Celsius), and good corrosion resistance properties.

In applications where a heat activated, thermally expanding material is employed, an important consideration involved with the selection and formulation of the material comprising the structural foam 14 is the temperature at which a material reaction or expansion, and possibly curing, will take place. For instance, in most applications, it is undesirable for the material to be reactive at room temperature or otherwise at the ambient temperature in a production line environment. More typically, the structural foam 14 becomes active at higher processing temperatures, such as those encountered in an automobile assembly plant, when the foam 14 is processed along with the automobile components at elevated temperatures or at higher applied energy levels. While temperatures encountered in an automobile assembly operation may be in the range of 148.89° C. to 204.44° C. (300° F. to 400° F.), body and paint shop applications are commonly about 93.33° C. (200° F.) or slightly higher. Generally, prior art expandable foams have a range of expansion ranging from approximately 0 to over 1000 percent. The level of expansion of the structural foam 14 may be increased to as high as 1500 percent or more. Higher expansion, now ever, typically results in mechanical property reduction.

The reinforcement member 10 may be used in numerous applications where structural reinforcement is desired. More particularly, the reinforcement member 10 has particular application in those instances where the overall weight of the structure being reinforced is a critical factor. For example, the reinforcement member 10 may be used to reinforce the frames of automobiles, airplanes, boats, building structures and other similar objects.

Figure 5:
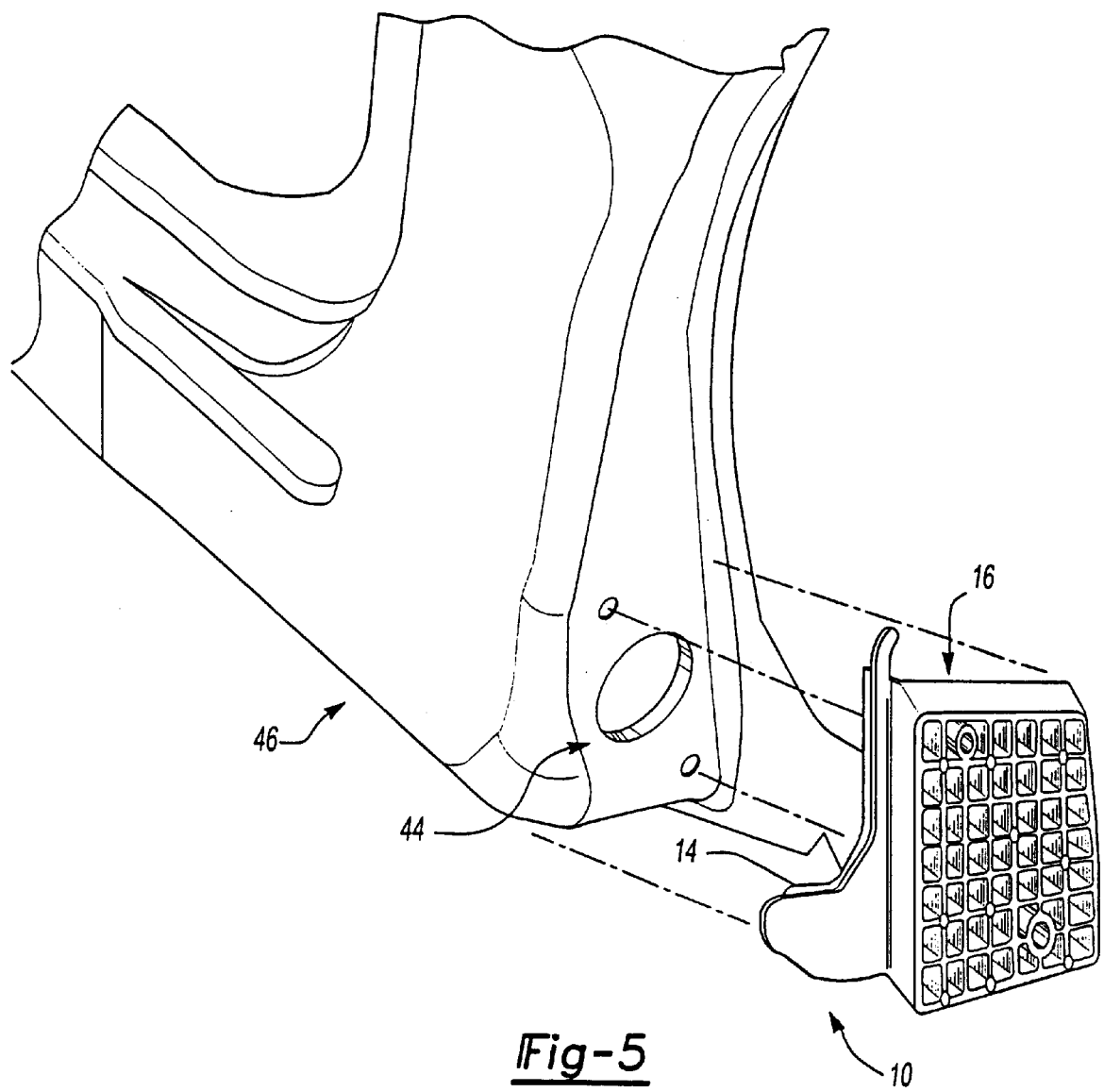
FIG. 5 shows an assembly view of the structural reinforcement member of FIG. 1 installed in the wheel well portion of an automobile frame.

FIG. 5 illustrates the reinforcement member 10 being installed in a wheel well portion 44 of an automobile frame 46. As can be seen in the figure, the reinforcement member 10 fits against the wheel well portion 44 so that the load distributing medium 14 is in contact with the frame 46. The load distributing medium 14 is then cured in the course of the automotive assembly process.

Once the load distributing medium 14 is cured, the structural foam 14 expands along the front surface 16 and fills the gap 46 surrounding the circular protrusion 28. When placed adjacent a structure to be reinforced, i.e., the wheel well 44, the cured structural foam acts as an adhesive and thus bonds the reinforcement member 10 to the element being reinforced.

The structural foam 14 is fully cured by subjecting the reinforcement member 10 to temperatures in the range of those generated by a paint oven of the type used to cure automobile body paint or primer. It will be appreciated that paint ovens are known to reach minimum temperatures of 93.33° C. (200° F.) or greater. Thus, it will be appreciated that the structural foam 14 may be cured by simply heating the reinforcement member 10 to a temperature of 93.33° C. (200° F.) or greater.

The curing of the structural from 14 increases the structural strength and stiffness of the carrier 12. As a result, the overall structural strength and stiffness of the reinforcement member 10 is increased.

The preferred embodiment of the present invention has been disclosed. A person of ordinary skill in the art would realize, however, that certain modifications would come within the teachings of this invention. Therefore, the following claims should be studied to determine the true scope and content of the invention.

What is claimed is:

1. A structural reinforcement member for structurally reinforcing a surface portion of an automotive vehicle frame, comprising:
   a carrier adapted for placement adjacent the surface portion of the automotive vehicle frame, the carrier having a front surface and opposing sides extending away from the front surface wherein the front surface is configured to oppose the surface portion of the automotive vehicle frame and the front surface has a surface area greater than either one of the opposing sides and wherein the carrier includes a reinforced protrusion on the front surface, the protrusion configured for insertion into an aperture in the surface portion of the vehicle frame; and
   a load distributing medium coating a substantial portion of the front surface, the load distributing medium being configured to expand upon activation and thereafter to cure thereby hardening the load distributing medium, wherein:
   i) the load distributing medium adheres the carrier to the surface portion of the vehicle frame;
   ii) the surface portion of the vehicle frame is structurally reinforced with the carrier having the increase in the structural strength due at least in part to the load distributing medium;
   iii) the opposing sides of the carrier are substantially free of any contact with the load distributing medium; and
   iv) the load distributing medium is configured to primarily contact the surface portion of the vehicle frame without contacting other portions of the vehicle frame.

2. The structural reinforcement member of claim 1 wherein the carrier supports an outwardly extending flange.

3. The structural reinforcement member of claim 1 wherein the carrier comprises a polymeric material having moldable characteristics.

4. The structural reinforcement member of claim 1, wherein the carrier is comprised of nylon.

5. The structural reinforcement member of claim 1, wherein the load distributing medium is a structural foam.

6. The structural reinforcement member of claim 5, wherein the structural foam includes a curing agent.

7. The structural reinforcement member of claim 5, wherein the structural foam is formed from an epoxy-based resin.

8. The structural reinforcement member of claim 1, wherein the surface portion of the vehicle frame is provided by a wheel well of the automotive vehicle.

9. A structural reinforcement member for reinforcing a surface portion of a wheel well in an automotive vehicle frame, comprising:
   a carrier adapted for placement adjacent the surface portion of the wheel well in the automotive vehicle frame, the carrier having a front surface and opposing sides extending away from the front surface wherein the front surface is configured to oppose the surface portion of the wheel well portion and the front surface has a surface area greater than either one of the opposing sides and wherein the carrier includes a reinforced protrusion on the front surface, the protrusion configured for insertion into an aperture in the surface portion of the vehicle frame; and
   a load distributing medium coating a substantial portion of the front surface, the load distributing medium being configured to expand upon activation and thereafter to cure thereby hardening the load distributing medium, wherein;
   i) the load distributing medium adheres the carrier to the surface portion of the vehicle frame;
   ii) the surface portion of the vehicle frame is structurally reinforced with the carrier having the increase in the structural strength due at least in part to the load distributing medium;
   iii) the opposing sides of the carrier are substantially free of any contact with the load distributing medium; and
   iv) the load distributing medium is configured to primarily contact the surface portion of the vehicle frame without contacting other portions of the vehicle frame.

10. The structural reinforcement member of claim 9, wherein the carrier supports an outwardly extending flange.

11. The structural reinforcement member of claim 9 wherein the load distributing medium is formed from an epoxy-based resin.

12. The structural reinforcement member of claim 9 wherein the load distributing medium comprises a polymeric material having moldable characteristics.

13. The structural reinforcement member of claim 9, wherein the front surface is supported by a lattice structure.

14. A method for reinforcing a surface portion of an automotive vehicle frame, comprising the steps of:
   (a) providing a structural reinforcement member including a carrier and a load distributing medium wherein:
      (i) the carrier has a front surface and opposing sides extending away from the front surface wherein the front surface has a surface area greater than either one of the opposing sides;
      (ii) the carrier includes a reinforced protrusion on the front surface, the protrusion configured for insertion into an aperture in the surface portion of the vehicle frame; and
      (iii) a load distributing medium coating a substantial portion of the front surface, the load distributing medium being configured to expand upon activation and thereafter to cure thereby hardening the load distributing medium;
   (b) positioning the reinforcement member adjacent the surface portion of the vehicle frame such that the front surface of the carrier opposes the surface portion of the automotive vehicle frame and such that the load distributing medium is disposed between the front surface of the carrier and the surface portion of the automotive vehicle frame; and
   (c) activating the load distributing medium to expand and wet substantially only the surface portion of the vehicle frame and the front surface of the carrier without wetting other portions of the vehicle frame;
   (d) curing the load distributing medium to adhere the medium to the front surface of the carrier and to the surface portion of the vehicle frame, wherein the surface portion of the vehicle frame is structurally reinforced with the carrier having the increase in the structural strength due at least in part to the load distributing medium and wherein the opposing sides of the carrier are substantially free of any contact with the load distributing medium.

15. The method of claim 14, wherein the front surface is reinforced by a lattice network.

16. The method of claim 14, wherein the load distributing medium is formed from an epoxy-based resin.

17. The method of claim 14, wherein the load distributing medium comprises a polymeric material having moldable characteristics.

* * * * *

UNITED STATES PATENT AND TRADEMARK OFFICE
CERTIFICATE OF CORRECTION

PATENT NO.    : 6,474,722 B2
DATED         : November 5, 2002
INVENTOR(S)   : William J. Barz It is certified that error appears in the above-identified patent and that said Letters Patent is hereby corrected as shown below:

Title page,
Item [56], References Cited, U.S. PATENT DOCUMENTS, replace "6,199,040" with -- 6,199,940 --.

Item [74], *Attorney, Agent or Firm*, replace "Debrusin" with -- Dobrusin --.

Signed and Sealed this

Twenty-seventh Day of May, 2003

JAMES E. ROGAN
*Director of the United States Patent and Trademark Office*